(12) United States Patent
Yamano et al.

(10) Patent No.: US 11,670,785 B2
(45) Date of Patent: Jun. 6, 2023

(54) OPERATING METHOD OF FUEL CELL SYSTEM

(71) Applicant: HONDA MOTOR CO., LTD., Tokyo (JP)

(72) Inventors: Naoki Yamano, Wako (JP); Takuya Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,239

(22) Filed: Feb. 24, 2022

(65) Prior Publication Data

US 2022/0320550 A1 Oct. 6, 2022

(30) Foreign Application Priority Data

Mar. 31, 2021 (JP) .............................. JP2021-061777

(51) Int. Cl.
*H01M 8/04746* (2016.01)
*H01M 8/0432* (2016.01)
(Continued)

(52) U.S. Cl.
CPC ... *H01M 8/04768* (2013.01); *H01M 8/04029* (2013.01); *H01M 8/04074* (2013.01); *H01M 8/04358* (2013.01); *H01M 2250/20* (2013.01)

(58) Field of Classification Search
CPC ......... H01M 8/04768; H01M 8/04029; H01M 8/04074; H01M 8/04358; H01M 2250/20; H01M 8/249
See application file for complete search history.

(56) References Cited

U.S. PATENT DOCUMENTS

2021/0098805 A1* 4/2021 Poirier ................. H01M 8/249
2021/0391588 A1* 12/2021 Won .................. H02M 3/33584
(Continued)

FOREIGN PATENT DOCUMENTS

JP 2006-302746 11/2006
JP 2007-164998 6/2007
(Continued)

OTHER PUBLICATIONS

Japanese Office Action for Japanese Office Action Patent No. 2021-061777 dated Jan. 4, 2023.

*Primary Examiner* — Stewart A Fraser
(74) *Attorney, Agent, or Firm* — Amin, Turocy & Watson, LLP

(57) ABSTRACT

A method of operating a fuel cell system which has a plurality of fuel cell stacks, and includes a first refrigerant passage, a second refrigerant passage, a first temperature acquisition unit, a second temperature acquisition unit, a first refrigerant circulation passage, a first refrigerant pumping unit, a first heat exchanger and a first flow rate adjusting valve includes: after the plurality of fuel cell stacks are stopped, until a predetermined condition is satisfied, driving the first refrigerant pumping unit; and causing the first flow rate adjusting valve to adjust the flow rate of the refrigerant flowing through the first refrigerant passage and the flow rate of the refrigerant flowing through the second refrigerant passage, on the basis of the temperature of the refrigerant flowing through each of the first refrigerant passage and the second refrigerant passage acquired by the first temperature acquisition unit and the second temperature acquisition unit.

4 Claims, 3 Drawing Sheets

(51) Int. Cl.
*H01M 8/04007* (2016.01)
*H01M 8/04029* (2016.01)

(56) References Cited

U.S. PATENT DOCUMENTS

2023/0006224 A1* 1/2023 Won ................... H01M 8/04686
2023/0008445 A1* 1/2023 Choi ................. H01M 8/04074

FOREIGN PATENT DOCUMENTS

| | | |
|---|---|---|
| JP | 2008-071539 | 3/2008 |
| JP | 2008-510271 | 4/2008 |
| JP | 2011-008916 | 1/2011 |
| JP | 2019-204717 | 11/2019 |
| WO | 2014/174982 | 10/2014 |

* cited by examiner

OPERATING METHOD OF FUEL CELL SYSTEM

CROSS-REFERENCE TO RELATED APPLICATION

Priority is claimed on Japanese Patent Application No. 2021-061777, filed Mar. 31, 2021, the content of which is incorporated herein by reference.

BACKGROUND OF THE INVENTION

Field of the Invention

The present invention relates to a method of operating a fuel cell system.

Description of Related Art

In the related art, a fuel cell system which includes a plurality of fuel cell stacks and in which usage methods of each of the fuel cell stacks are different is known (see, for example, International Publication No. 2014/174982).

SUMMARY OF THE INVENTION

When the usage methods of each fuel cell stack are different, the temperature (calorific values) of each fuel cell stack is also different. When there is a difference in temperature between different fuel cell stacks, there is also a difference in the degree of deterioration. When the degrees of deterioration of a plurality of fuel cell stacks are different, maintenance timing and durability of each fuel cell stack are also different, which requires time and effort to manage.

An aspect according to the present invention has been made in consideration of such circumstances, and an object thereof is to provide a method of operating a fuel cell system capable of suppressing a variation in temperature of a plurality of fuel cell stacks, in a fuel cell stack including the plurality of fuel cell stacks.

In order to solve the above problems and achieve the above object, the present invention has adopted the following aspects.

(1) According to an aspect of the present invention, there is provided a method of operating a fuel cell system having a plurality of fuel cell stacks, in which the fuel cell system includes a first refrigerant passage configured to cause a refrigerant to flow through a first fuel cell stack among the plurality of fuel cell stacks; a second refrigerant passage configured to cause the refrigerant to flow through a second fuel cell stack among the plurality of fuel cell stacks; a temperature acquisition unit configured to acquire a temperature of the refrigerant in each of the first refrigerant passage and the second refrigerant passage on a downstream side of the first fuel cell stack and the second fuel cell stack; a first refrigerant circulation passage configured to cause the refrigerant flowing through the first refrigerant passage and the second refrigerant passage to flow to an upstream side of the first refrigerant passage and the second refrigerant passage; a first refrigerant pumping unit provided in the first refrigerant circulation passage; a first heat exchanger provided in the first refrigerant circulation passage; and a first flow rate adjusting valve configured to adjust a flow rate of the refrigerant flowing through the first refrigerant passage and a flow rate of the refrigerant flowing through the second refrigerant passage, at a branching unit branching from the first refrigerant circulation passage to the first refrigerant passage and the second refrigerant passage, the first refrigerant passage and the second refrigerant passage are provided in parallel, after the plurality of fuel cell stacks are stopped and until a predetermined condition is satisfied, the first refrigerant pumping unit is driven, and the first flow rate adjusting valve adjusts the flow rate of the refrigerant flowing through the first refrigerant passage and the flow rate of the refrigerant flowing through the second refrigerant passage on the basis of the temperature of the refrigerant flowing through each of the first refrigerant passage and the second refrigerant passage acquired by the temperature acquisition unit.

(2) In the aspect of (1) above, the predetermined condition may be that a temperature difference between the temperature of the refrigerant of the first refrigerant passage and the temperature of the refrigerant of the second refrigerant passage is equal to or lower than a predetermined value, and at least one of the temperature of the refrigerant of the first refrigerant passage and the temperature of the refrigerant of the second refrigerant passage is equal to or lower than a first temperature.

(3) In the aspect of (1) or (2) above, the fuel cell system may include a gathering unit configured to gather the first refrigerant passage and the second refrigerant passage on the downstream side of the temperature acquisition unit, a second refrigerant circulation passage configured to selectively divide the refrigerant from the gathering unit or the first refrigerant circulation passage on a downstream side of the gathering unit using a second flow rate adjusting valve, and return the refrigerant to the first refrigerant circulation passage on an upstream side of the branching unit, a second refrigerant pumping unit provided in the second refrigerant circulation passage, and a second heat exchanger provided in the second refrigerant circulation passage, after the predetermined condition is satisfied, the first refrigerant pumping unit may be stopped, and the second refrigerant pumping unit may be driven to cause the refrigerant to flow through the second refrigerant circulation passage.

(4) In the aspect of (3) above, the fuel cell system may include a refrigerant circulation temperature acquisition unit configured to acquire the temperature of the refrigerant of the second refrigerant circulation passage, and when at least one selected from the temperature of the refrigerant of the second refrigerant circulation passage acquired by the refrigerant circulation temperature acquisition unit, the temperature of the refrigerant of the first refrigerant passage, and the temperature of the refrigerant of the second refrigerant passage is equal to or lower than a second temperature, the second refrigerant pumping unit may be stopped.

According to the above (1), after the plurality of fuel cell stacks are stopped and until a predetermined condition is satisfied, the first refrigerant pumping unit is driven, and the first flow rate adjusting valve adjusts the flow rate of the refrigerant flowing through the first refrigerant passage and the flow rate of the refrigerant flowing through the second refrigerant passage on the basis of the temperature of the refrigerant flowing through each of the first refrigerant passage and the second refrigerant passage acquired by the temperature acquisition unit. As a result, the refrigerant circulates inside the closed circuit including the plurality of fuel cell stacks, and the temperature variation of the plurality of fuel cell stacks can be reduced.

In the case of (2) above, the predetermined condition is that a temperature difference between the temperature of the refrigerant of the first refrigerant passage and the temperature of the refrigerant of the second refrigerant passage is equal to or lower than a predetermined value, and at least one of the temperature of the refrigerant of the first refrigerant passage and the temperature of the refrigerant of the second refrigerant passage is equal to or lower than a first temperature. This makes it possible to reduce the temperature variation of the plurality of fuel cell stacks.

In the case of (3) above, after the predetermined condition is satisfied, the first refrigerant pumping unit is stopped, and the second refrigerant pumping unit is driven to cause the refrigerant to flow through the second refrigerant circulation passage. This makes it possible to reduce the temperature variation of the entire fuel cell system.

In the case of (4) above, when at least one selected from the temperature of the refrigerant of the second refrigerant circulation passage acquired by the refrigerant circulation temperature acquisition unit, the temperature of the refrigerant of the first refrigerant passage, and the temperature of the refrigerant of the second refrigerant passage is equal to or lower than a second temperature, the second refrigerant pumping unit is stopped. This makes it possible to reduce the temperature variation of the entire fuel cell system. As a result, since the temperature variation of the entire fuel cell system can be suppressed when stopped, it is possible to suppress a variation between an elution amount of ions of the first fuel cell stack and an elution amount of ions of the second fuel cell stack when stopped. Accordingly, it is possible to prevent variations in the degree of deterioration of each fuel cell stack due to differences in the elution amount of ions.

DETAILED DESCRIPTION OF THE INVENTION

Hereinafter, embodiments of the present invention will be described with reference to the drawings.

Figure 1:
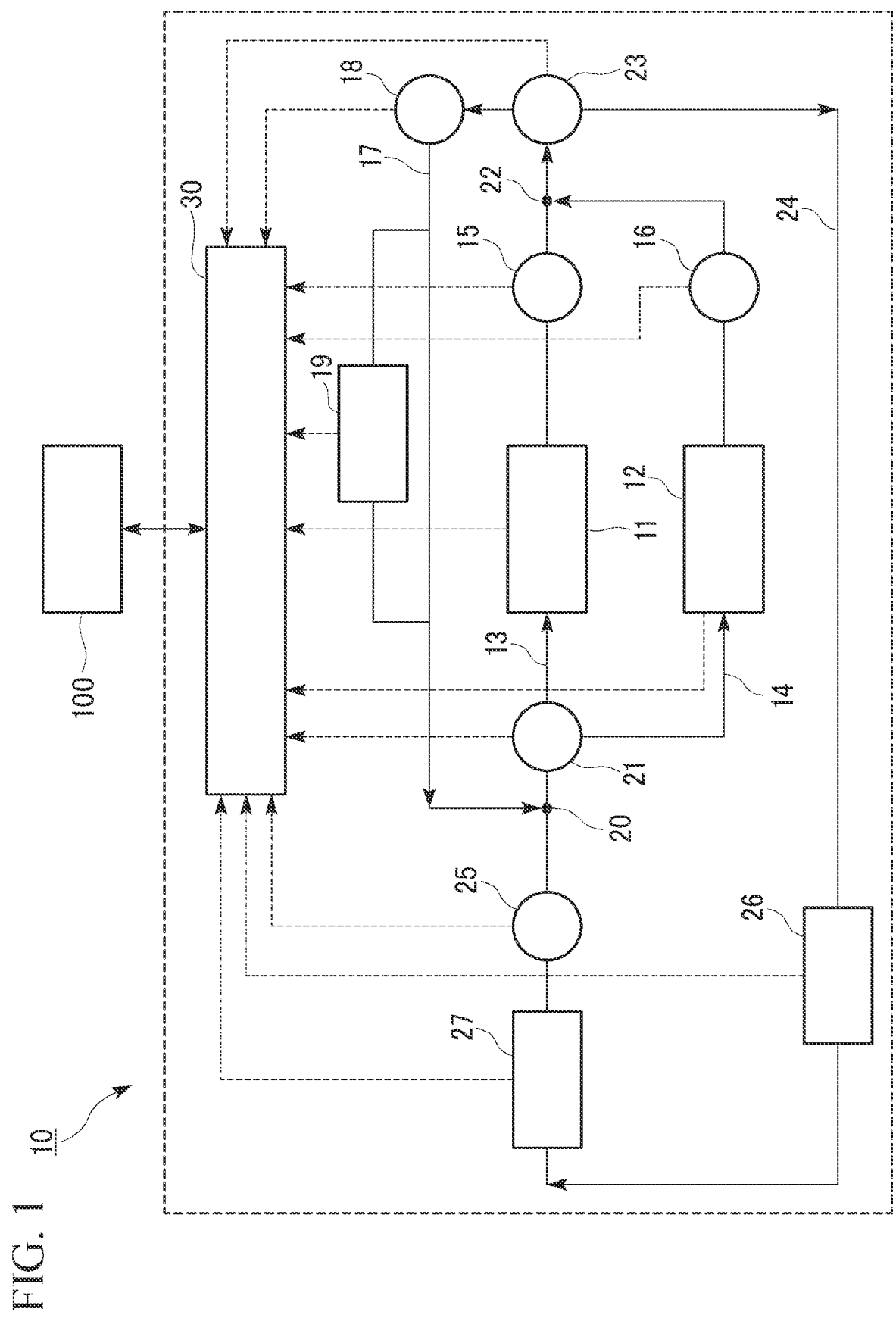
FIG. 1 is a schematic diagram showing a fuel cell system according to an embodiment of the present invention.

FIG. 1 is a schematic diagram showing a fuel cell system 10 in the embodiment. The fuel cell system 10 can be mounted, for example, on a vehicle. In addition to the fuel cell system 10, the vehicle may include devices such as a power storage device, a motor, a radiator, and a refrigerant tank. The vehicle may include a fuel cell system 10 and a control device 100 that controls other devices. The control device 100 of the vehicle may transmit and receive signals to and from a control unit (a control device (a FC control device)) 30 of the fuel cell system 10.

The fuel cell system 10 includes a first fuel cell (FC) stack 11, a second fuel cell (FC) stack 12, a first refrigerant passage 13, a second refrigerant passage 14, a first temperature acquisition unit 15, a second temperature acquisition unit 16, a first refrigerant circulation passage 17, a first refrigerant pumping unit 18, a first heat exchanger 19, a branching unit 20, a first flow rate adjusting valve 21, and an FC control device 30 that is an example of a control unit. The FC control device 30 is connected to each constituent component of the fuel cell system 10 by a signal line. In the fuel cell system 10, a cooling system circuit which includes the first refrigerant passage 13, the second refrigerant passage 14, the first temperature acquisition unit 15, the second temperature acquisition unit 16, the first refrigerant circulation passage 17, the first refrigerant pumping unit 18, a first heat exchanger 19, a branching unit 20, and a first flow rate adjusting valve 21 is formed. The fuel cell system 10 may include a gathering unit 22, a second flow rate adjusting valve 23, a second refrigerant circulation passage 24, a second refrigerant pumping unit 25, a second heat exchanger 26, and an IPU 27.

The first fuel cell stack 11 and the second fuel cell stack 12 are, for example, solid polymer fuel cells. The polymer electrolyte fuel cell includes, for example, a plurality of stacked fuel cell cells, and a pair of end plates that sandwich the stacked body of the plurality of fuel cell cells. The fuel cell includes an electrolyte electrode structure and a pair of separators that sandwich the electrolyte electrode structure. The electrolyte electrode structure includes a solid polymer electrolyte membrane, and a fuel electrode and an oxygen electrode that sandwich the solid polymer electrolyte membrane. The solid polymer electrolyte membrane includes a cation exchange membrane or the like. The fuel electrode (anode) includes an anode catalyst, a gas diffusion layer, and the like. The oxygen electrode (cathode) includes a cathode catalyst, a gas diffusion layer, and the like. The first fuel cell stack 11 and the second fuel cell stack 12 generate power by a catalytic reaction between the fuel gas supplied from the fuel tank to the anode and an oxidizing agent gas such as oxygen-containing air supplied from the air pump to the cathode. Excess gas components and the like supplied to the fuel cell stack and not used are exhausted through a predetermined flow path. The first fuel cell stack 11 and the second fuel cell stack 12 are provided in parallel. When the fuel cell system 10 is mounted on a vehicle, for example, the output of the second fuel cell stack 12 is adjusted by operating the accelerator.

The first refrigerant passage 13 is connected to the first fuel cell stack 11 and causes the refrigerant to flow through the first fuel cell stack 11. The second refrigerant passage 14 is connected to the second fuel cell stack 12 and causes the refrigerant to flow through the second fuel cell stack 12. The first refrigerant passage 13 and the second refrigerant passage 14 are provided in parallel.

The first temperature acquisition unit 15 and the second temperature acquisition unit 16 are temperature measuring devices such as a thermometer. The first temperature acquisition unit 15 is provided in the first refrigerant passage 13 on a downstream side of the first fuel cell stack 11 and acquires the temperature of the refrigerant at that position. The second temperature acquisition unit 16 is provided in the second refrigerant passage 14 on a downstream side of the second fuel cell stack 12, and acquires the temperature of the refrigerant at that position.

The first refrigerant circulation passage 17 is connected to the first refrigerant passage 13 and the second refrigerant passage 14, and causes the refrigerant flowing through the first refrigerant passage 13 and the second refrigerant passage 14 to flow to the upstream side of the first refrigerant passage 13 and the second refrigerant passage 14.

The first refrigerant pumping unit 18 is provided in the first refrigerant circulation passage 17.

The first heat exchanger 19 is provided in the first refrigerant circulation passage.

The branching unit 20 branches from the first refrigerant circulation passage 17 to the first refrigerant passage 13 and the second refrigerant passage 14.

The first flow rate adjusting valve 21 is provided between the branching unit 20, the first refrigerant passage 13, and the second refrigerant passage 14, and adjusts the flow rate of the refrigerant flowing through the first refrigerant passage 13 and the flow rate of the refrigerant flowing through the second refrigerant passage 14.

The gathering unit 22 is provided on the downstream side of the first temperature acquisition unit 15 and the second temperature acquisition unit 16, and gathers the first refrigerant passage 13 and the second refrigerant passage 14.

The second flow rate adjusting valve 23 is provided in the first refrigerant circulation passage 17 on the downstream side of the gathering unit 22. The second flow rate adjusting valve 23 selectively divides the refrigerant from the first refrigerant circulation passage 17.

The second refrigerant circulation passage 24 returns the refrigerant to the first refrigerant circulation passage 17 on the upstream side of the branching unit 20.

The second refrigerant pumping unit 25 is provided in the second refrigerant circulation passage 24 to cause the refrigerant to flow through the second refrigerant circulation passage 24.

The second heat exchanger 26 is, for example, a radiator. The second heat exchanger 26 is provided in the second refrigerant circulation passage 24 and performs a heat exchange with the refrigerant flowing through the second refrigerant circulation passage 24.

An intelligent power unit (IPU) 27 is a kind of power supply circuit control device. The IPU 27 is provided in the second refrigerant circulation passage 24.

A method of operating the fuel cell system 10 will be described.

In the fuel cell system 10, after the first fuel cell stack 11 and the second fuel cell stack 12 are stopped, until a predetermined condition is satisfied, the first refrigerant pumping unit 18 is driven, and the first flow rate adjusting valve 21 adjusts the flow rate of the refrigerant flowing through the first refrigerant passage 13 and the flow rate of the refrigerant flowing through the second refrigerant passage 14, on the basis of the temperature of the refrigerant flowing through each of the first refrigerant passage 13 and the second refrigerant passage 14 acquired by the first temperature acquisition unit 15. The predetermined condition is that a temperature difference between the temperature of the refrigerant of the first refrigerant passage 13 and the temperature of the refrigerant of the second refrigerant passage 14 is equal to or lower than a predetermined temperature, and at least one of the temperature of the refrigerant of the first refrigerant passage 13 and the temperature of the refrigerant of the second refrigerant passage 14 is equal to or lower than the first temperature. Further, after the predetermined condition is satisfied, the first refrigerant pumping unit 18 is stopped, and the second refrigerant pumping unit 25 is driven to cause the refrigerant to flow through the second refrigerant circulation passage 24.

A specific example of the method of operating the fuel cell system 10 will be described.

Figure 2:
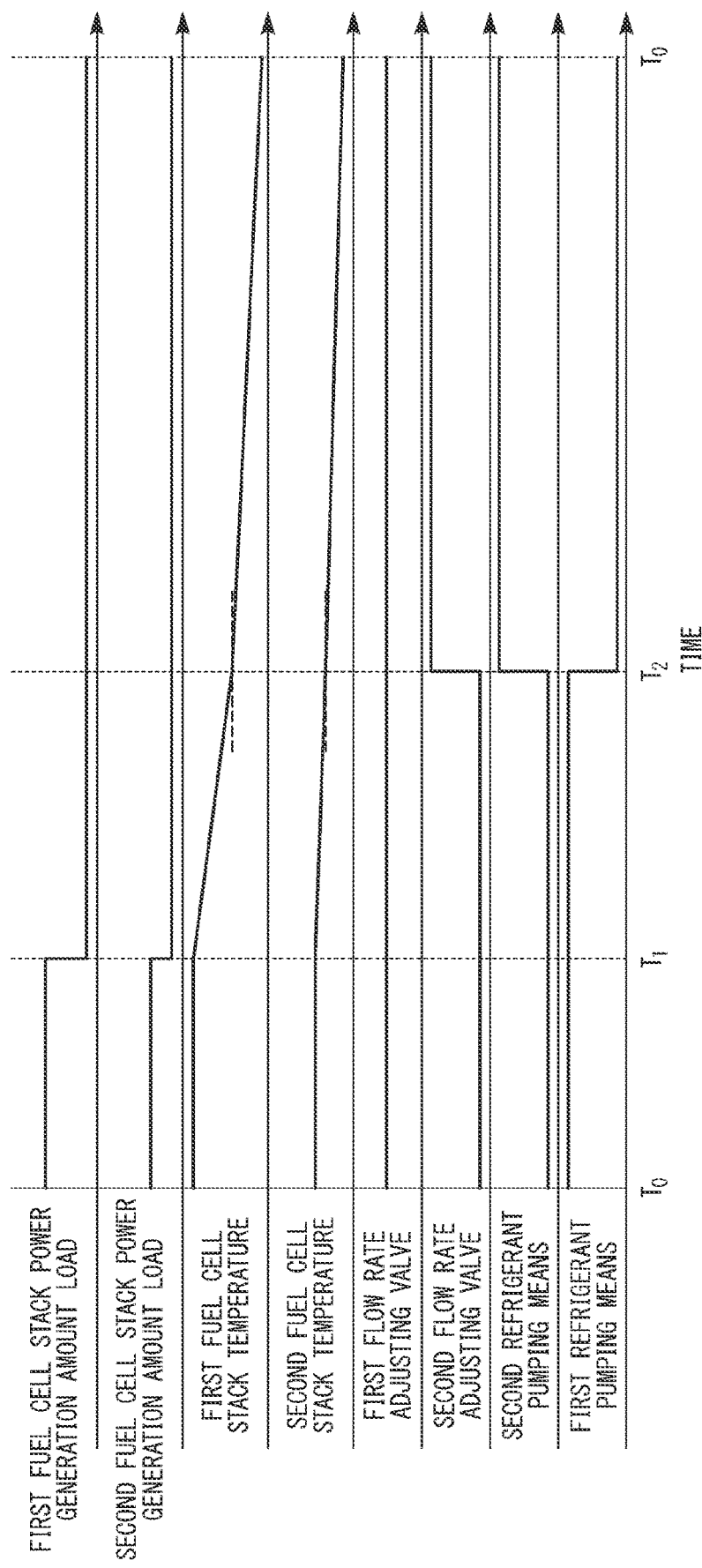
FIG. 2 is an example of a system flow showing a method of operating the fuel cell system according to an embodiment of the present invention.

FIG. 2 is an example of a system flow showing a method of operating the fuel cell system 10.

At $T_0$ to $T_1$, the first fuel cell stack 11 and the second fuel cell stack 12 generates power. A power generation amount of the first fuel cell stack 11 is larger than a power generation amount of the second fuel cell stack 12. Therefore, the temperature of the first fuel cell stack 11 is higher than the temperature of the second fuel cell stack 12. The first flow rate adjusting valve 21 is opened, and the second flow rate adjusting valve 23 is closed. The first refrigerant pumping unit 18 is started, and the second refrigerant pumping unit 25 is stopped. Since the second flow rate adjusting valve 23 is closed and the second refrigerant pumping unit 25 is stopped, the refrigerant circulates in a closed circuit that includes the first fuel cell stack 11, the second fuel cell stack 12, and the first heat exchanger 19. That is, the refrigerant flowing through the first refrigerant passage 13 and the second refrigerant passage 14 gathered in the gathering unit 22 returns to the upstream side of the first refrigerant passage 13 and the second refrigerant passage 14 via the first refrigerant circulation passage 17. This makes it possible to reduce the temperature variation between the first fuel cell stack 11 and the second fuel cell stack 12.

At $T_2$, after the predetermined condition is satisfied, the first refrigerant pumping unit 18 is stopped, the second refrigerant pumping unit 25 is driven, the second flow rate adjusting valve 23 is opened to cause the refrigerant to flow through the second refrigerant circulation passage 24. The refrigerant flowing through the second refrigerant circulation passage 24 exchanges heat with the second heat exchanger 26. As a result, the temperature of the entire fuel cell system 10 is lowered. At $T_2$ to $T_3$, change rate (decrease rate) of the temperature the first fuel cell stack 11 and the change rate (decrease rate) of the temperature of the second fuel cell stack 12 are substantially the same. That is, it is possible to reduce the temperature variation of the entire fuel cell system 10.

As described above, in the method of operating the fuel cell system of the embodiment, after the first fuel cell stack 11 and the second fuel cell stack 12 are stopped, until a predetermined condition is satisfied, the first refrigerant pumping unit 18 is driven, and the first flow rate adjusting valve 21 adjusts the flow rate of the refrigerant flowing through the first refrigerant passage 13 and the flow rate of the refrigerant flowing through the second refrigerant passage 14, on the basis of the temperature of the refrigerant flowing through each of the first refrigerant passage 13 and the second refrigerant passage 14 acquired by the first temperature acquisition unit 15 and the second temperature acquisition unit 16. As a result, the refrigerant circulates inside the closed circuit including the first fuel cell stack 11 and the second fuel cell stack 12, and it is possible to reduce the temperature variation between the first fuel cell stack 11 and the second fuel cell stack 12. The predetermined condition is that the temperature difference between the temperature of the refrigerant of the first refrigerant passage 13 and the temperature of the refrigerant of the second refrigerant passage 14 is equal to or lower than the predetermined temperature, and at least one of the temperature of the refrigerant of the first refrigerant passage 13 and the temperatures of the refrigerant of the second refrigerant passage 14 is equal to or lower than a first temperature. This makes it possible to reduce the temperature variation between the first fuel cell stack 11 and the second fuel cell stack 12. After the predetermined condition is satisfied, the first refrigerant pumping unit 18 is stopped, and the second refrigerant pumping unit 25 is driven to cause the refrigerant to flow through the second refrigerant circulation passage 24. This makes it possible to reduce the temperature variation of the entire fuel cell system 10.

(Other Examples)

Figure 3:
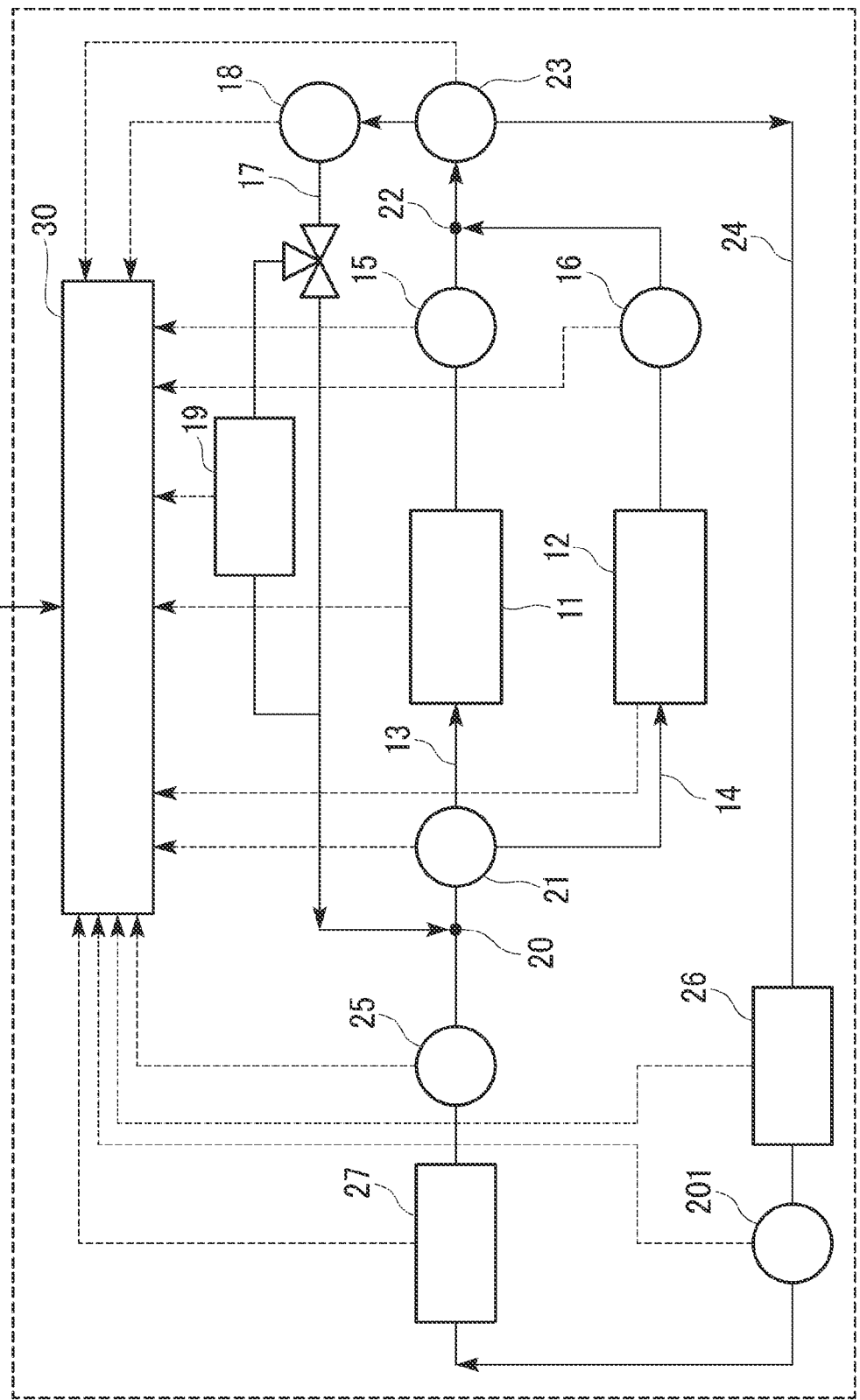
FIG. 3 is a schematic diagram showing the fuel cell system according to an embodiment of the present invention.

FIG. 3 is a schematic diagram showing a fuel cell system 200 in the embodiment.

In the fuel cell system 200, the same parts as the constituent elements in the fuel cell system 10 are denoted by the same reference numerals, the description thereof will not be provided, and only the differences will be described.

The fuel cell system 200 may include a refrigerant circulation temperature acquisition unit 201, in addition to the configuration of the fuel cell system 10.

The refrigerant circulation temperature acquisition unit 201 is provided in the second refrigerant circulation passage 24 and acquires the temperature of the refrigerant flowing through the second refrigerant circulation passage 24.

The method of operating the fuel cell system 200 will be described.

In the fuel cell system 200, when at least one selected from the temperature of the refrigerant of the second refrigerant circulation passage 24 acquired by the refrigerant circulation temperature acquisition unit 201, the temperature of the refrigerant of the first refrigerant passage 13, and the temperature of the refrigerant of the second refrigerant passage 14 becomes equal to or lower than a second temperature, the second refrigerant pumping unit 25 is stopped. As a result, the temperature variation of the entire fuel cell system 200 can be reduced, and the fuel cell system 200 can be safely stopped. As a result, since the temperature variation of the entire fuel cell system 200 can be suppressed when stopped, it is possible to suppress the variation between the elution amount of the ions of the first fuel cell stack 11 and the elution amount of the ions of the second fuel cell stack 12 during stop. Accordingly, it is possible to prevent variations in the degree of deterioration of each fuel cell stack due to differences in the elution amount of ions.

In the above-described embodiment, an example in which the fuel cell system is mounted on a fuel cell vehicle that uses the electric power generated in the fuel cell as the electric power for traveling or the electric power for operating an in-vehicle device has been described. However, the system may be mounted on two-wheeled vehicles, three-wheeled vehicles, four-wheeled vehicles, and other moving objects (e.g., ships, flying objects, robots), and may be mounted on stationary fuel cell systems.

The embodiments of the present invention are presented as an example, and are not intended to limit the scope of the invention. These embodiments can be implemented in various other embodiments, and various omissions, replacements, and changes can be made without departing from the gist of the invention. These embodiments and variations thereof are included in the scope of the invention described in the claims and the equivalent scope thereof, as are included in the scope and gist of the invention.

What is claimed is:

1. A method of operating a fuel cell system having a plurality of fuel cell stacks, the fuel cell system comprising:
a first refrigerant passage configured to cause a refrigerant to flow through a first fuel cell stack among the plurality of fuel cell stacks;
a second refrigerant passage configured to cause the refrigerant to flow through a second fuel cell stack among the plurality of fuel cell stacks;
a temperature acquisition unit configured to acquire a temperature of the refrigerant in each of the first refrigerant passage and the second refrigerant passage on a downstream side of the first fuel cell stack and the second fuel cell stack;
a first refrigerant circulation passage configured to cause the refrigerant flowing through the first refrigerant passage and the second refrigerant passage to flow to an upstream side of the first refrigerant passage and the second refrigerant passage;
a first refrigerant pumping unit provided in the first refrigerant circulation passage;
a first heat exchanger provided in the first refrigerant circulation passage; and
a first flow rate adjusting valve configured to adjust a flow rate of the refrigerant flowing through the first refrigerant passage and a flow rate of the refrigerant flowing through the second refrigerant passage, at a branching unit branching from the first refrigerant circulation passage to the first refrigerant passage and the second refrigerant passage,
wherein the first refrigerant passage and the second refrigerant passage are provided in parallel,
after the plurality of fuel cell stacks are stopped and until a predetermined condition is satisfied, the first refrigerant pumping unit is driven, and
the first flow rate adjusting valve adjusts the flow rate of the refrigerant flowing through the first refrigerant passage and the flow rate of the refrigerant flowing through the second refrigerant passage on the basis of the temperature of the refrigerant flowing through each of the first refrigerant passage and the second refrigerant passage acquired by the temperature acquisition unit.

2. The method of operating the fuel cell system according to claim 1, wherein the predetermined condition is that a temperature difference between the temperature of the refrigerant of the first refrigerant passage and the temperature of the refrigerant of the second refrigerant passage is equal to or lower than a predetermined value, and at least one of the temperature of the refrigerant of the first refrigerant passage and the temperature of the refrigerant of the second refrigerant passage is equal to or lower than a first temperature.

3. The method of operating the fuel cell system according to claim 1, wherein the fuel cell system includes
a gathering unit configured to gather the first refrigerant passage and the second refrigerant passage on the downstream side of the temperature acquisition unit;
a second refrigerant circulation passage configured to selectively divide the refrigerant from the gathering unit or the first refrigerant circulation passage on a downstream side of the gathering unit using a second flow rate adjusting valve, and return the refrigerant to the first refrigerant circulation passage on an upstream side of the branching unit,
a second refrigerant pumping unit provided in the second refrigerant circulation passage, and
a second heat exchanger provided in the second refrigerant circulation passage, and
after the predetermined condition is satisfied, the first refrigerant pumping unit is stopped, and the second refrigerant pumping unit is driven to cause the refrigerant to flow through the second refrigerant circulation passage.

4. The method of operating the fuel cell system according to claim 3, wherein the fuel cell system includes a refrigerant circulation temperature acquisition unit configured to acquire the temperature of the refrigerant of the second refrigerant circulation passage, and
when at least one selected from the temperature of the refrigerant of the second refrigerant circulation passage acquired by the refrigerant circulation temperature acquisition unit, the temperature of the refrigerant of the first refrigerant passage, and the temperature of the refrigerant of the second refrigerant passage is equal to or lower than a second temperature, the second refrigerant pumping unit is stopped.

\* \* \* \* \*